June 2, 1936.　　　L. G. HARTDORN　　　2,042,842
SHUTTER CONTROL FOR A COOLING SYSTEM
Filed Oct. 10, 1930　　　5 Sheets—Sheet 1
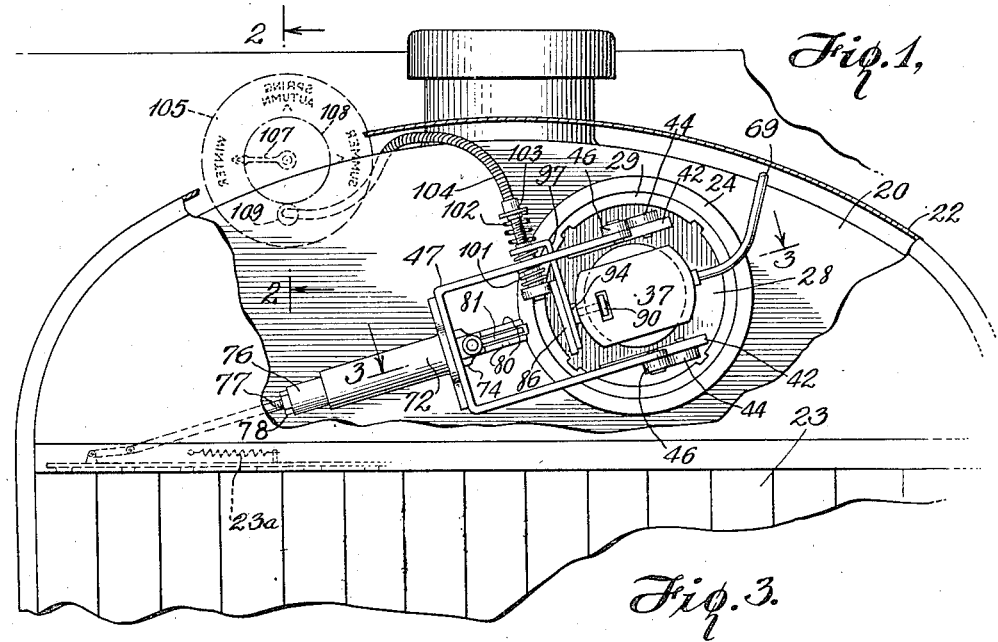
Fig. 1.
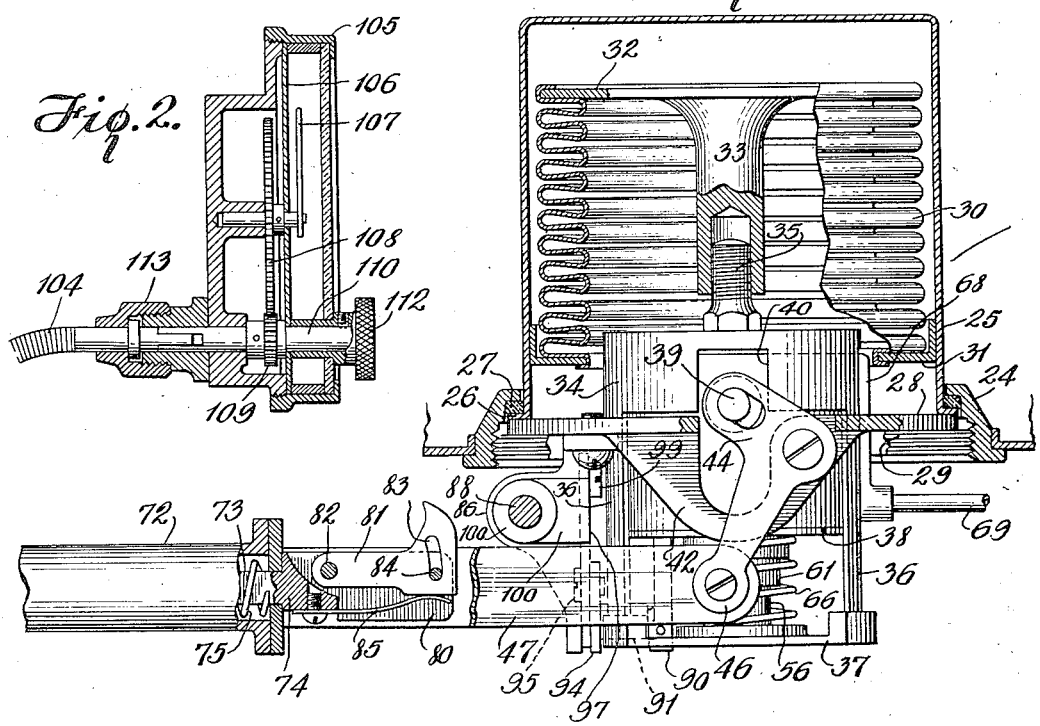
Fig. 2.
Fig. 3.
INVENTOR.
LOUIS G. HARTDORN
BY
Frederick P. Duncan,
ATTORNEY June 2, 1936.  L. G. HARTDORN  2,042,842
SHUTTER CONTROL FOR A COOLING SYSTEM
Filed Oct. 10, 1930  5 Sheets-Sheet 2
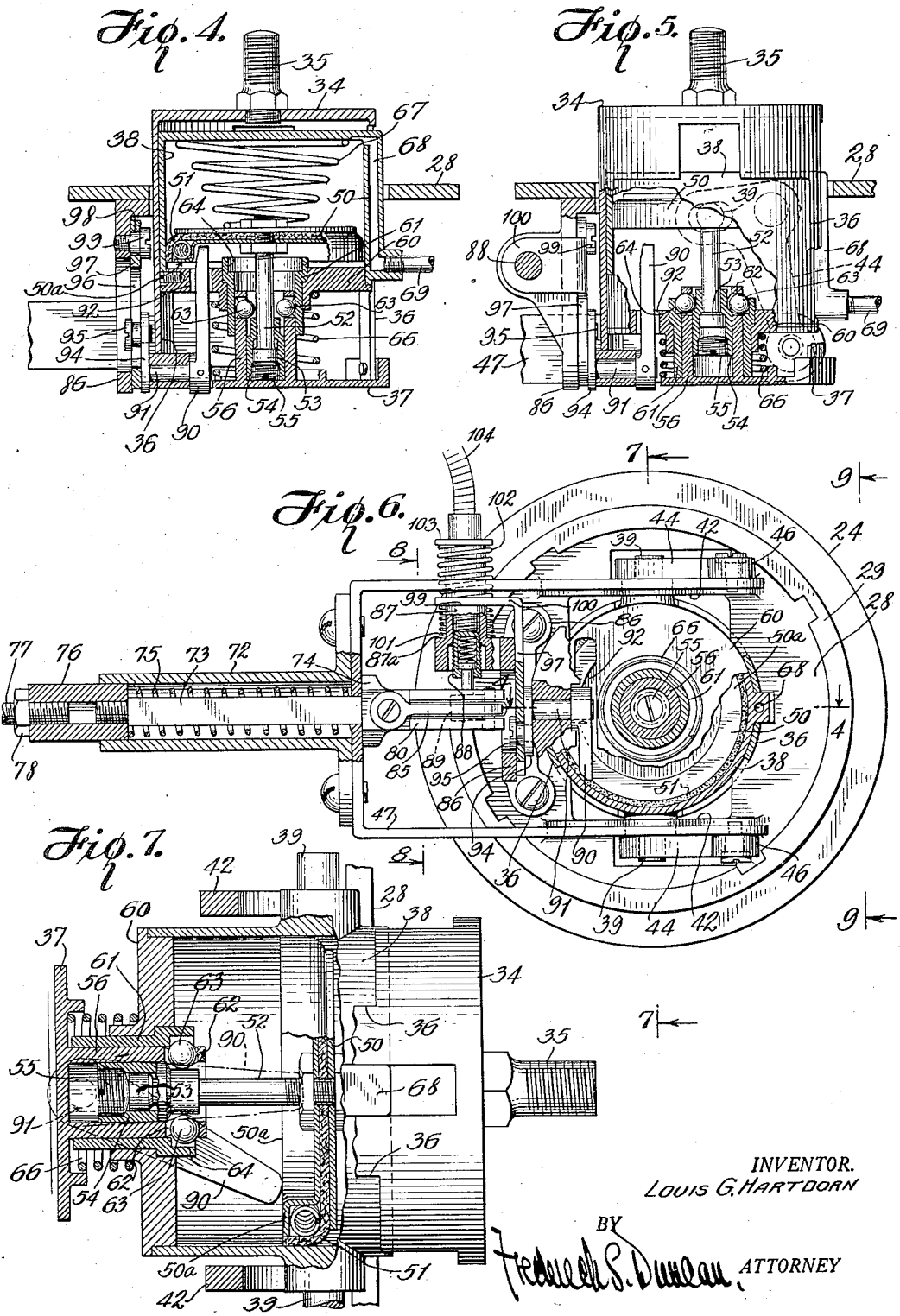
INVENTOR.
LOUIS G. HARTDORN
BY
Frederick S. Duncan, ATTORNEY

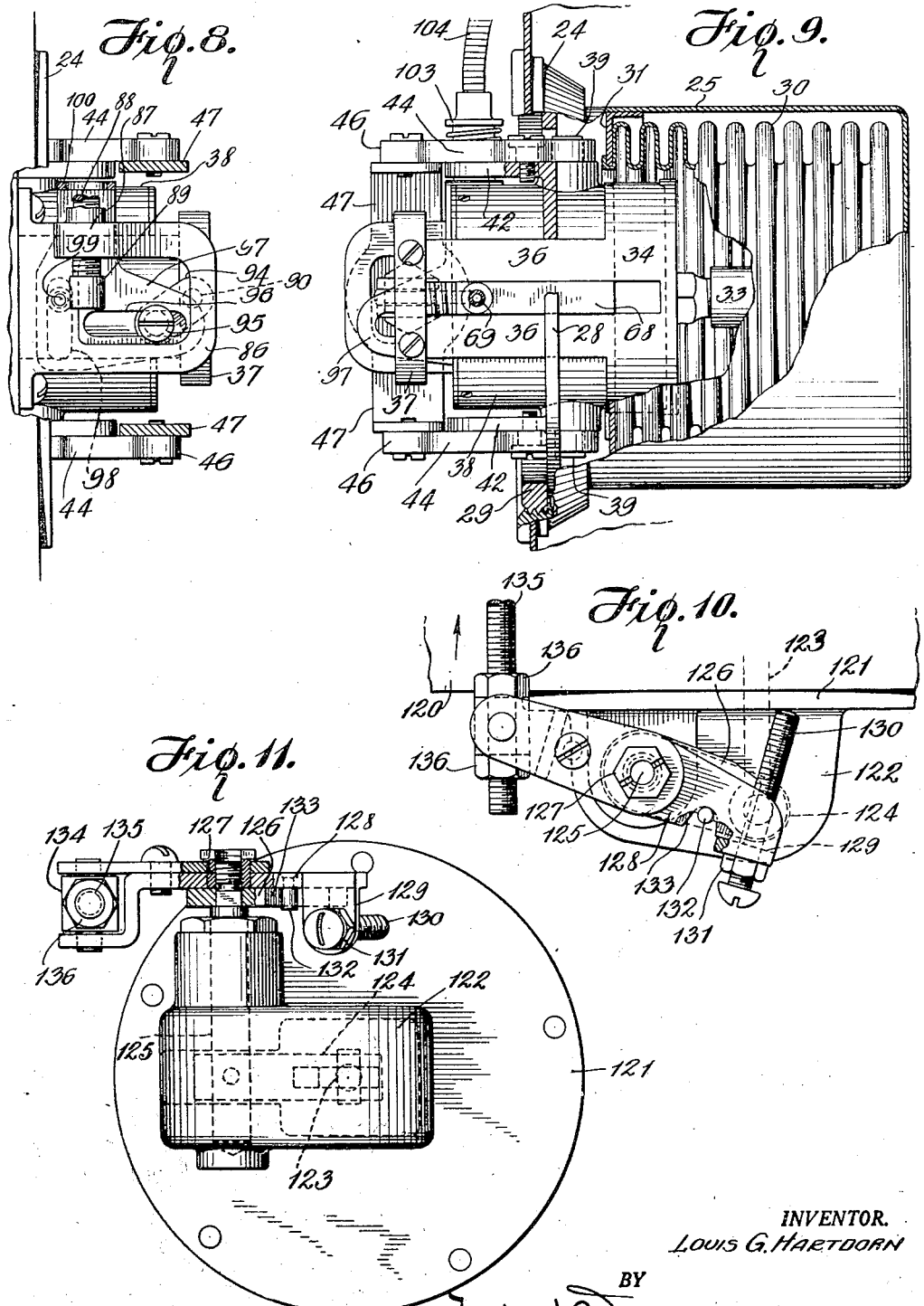

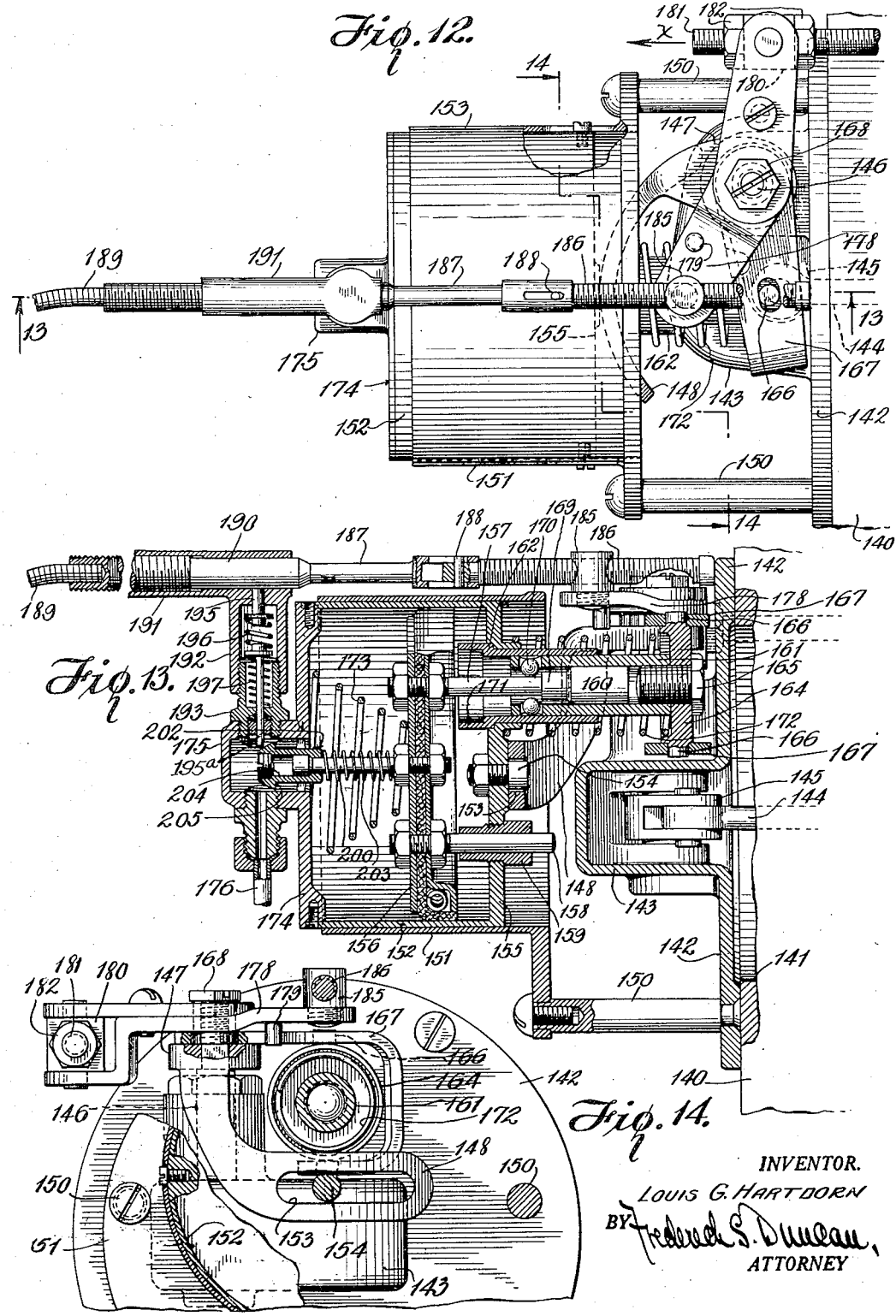

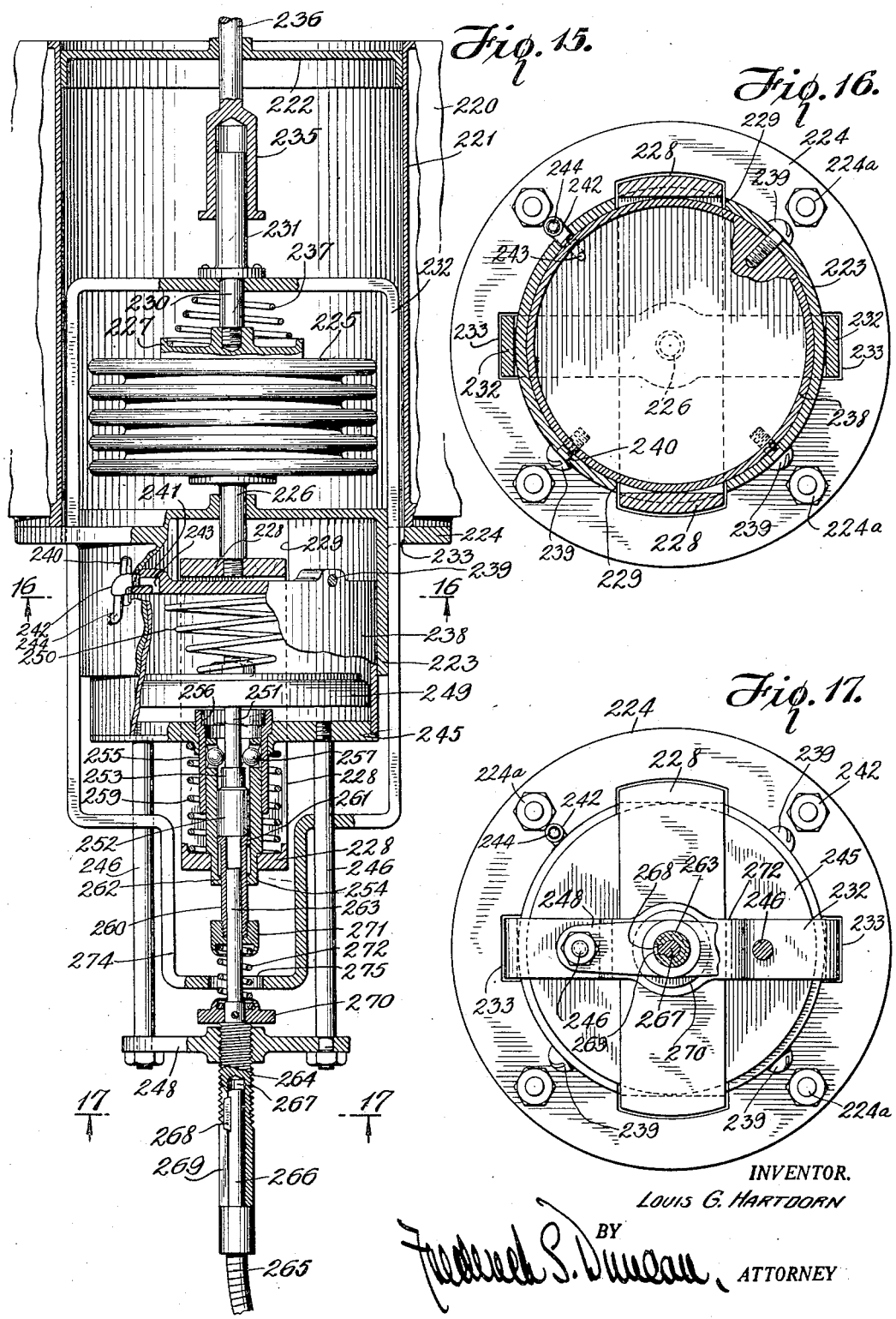

Patented June 2, 1936

2,042,842

UNITED STATES PATENT OFFICE 2,042,842

SHUTTER CONTROL FOR A COOLING SYSTEM

Louis G. Hartdorn, Forest Hills, N. Y.

Application October 10, 1930, Serial No. 487,700

17 Claims. (Cl. 123—174)

The present invention relates to control mechanism for the cooling system of internal combustion engines and more particularly to the thermostatic control of radiator shutters.

It is a common practice to connect the shutters of motor vehicle radiators to a thermostat placed in the radiator so that as the temperature of the radiator varies the shutters will be correspondingly opened or closed. A disadvantage of this arrangement in hot weather is that the thermostat does not respond quickly enough so that by the time the shutters have opened the radiator will be overheated. Even after the shutters are opened the cooling effect may not be adequate to carry off the surplus heat. It is an object of the present invention to provide a convenient means whereby the shutters may be locked open whenever desired.

Another object of the invention is to provide means for locking the shutters open without subjecting the thermostat to any strain.

The ordinary thermostatic control in which the shutters are directly connected to the thermostat is also unsatisfactory in cold weather because, due to sluggishness or heat inertia in the thermostat, the shutters are likely to remain open too long, particularly after the motor has been stopped, with the result that occasionally part of the cooling system actually freezes before the shutters close or the temperature of the cooling system drops below the freezing point. Hence, in cold weather it is desirable to have the shutters close as soon as the motor stops running, thereby conserving the heat in the radiator to facilitate restarting of the motor. On this account, my invention has for an object to provide means for automatically disestablishing the operative relation between the thermostat and the shutters when the motor stops running, so as to permit the shutters to close instantly under impulse of a spring, said means acting however to reestablish the operative relation between the thermostat and the shutters as soon as the motor is started.

I am aware that it is not new in the art to provide a connection between the thermostat and shutter which is controlled by the suction of the motor, but, heretofore, such connection has not been rigid but has varied with the suction so that under certain conditions the shutters would close when it was most necessary to keep them open.

In my Patent No. 1,775,344, issued September 9, 1930, I described a clutch mechanism between the thermostat and the shutters which clutch is fixed as long as the motor is running and which is disengaged as soon as the motor stops. In application Serial No. 361,562, filed May 9, 1929, a similar arrangement is provided, but, in this case, instead of directly controlling the connection between the thermostat and the shutters, I provide instead a backing for the thermostat which backing is fixed and holds the thermostat in operative position as long as the motor is running, but which when the motor stops is released so that the thermostat may expand or contract without in the least affecting the shutters, it being understood that the shutters will close immediately under impulse of a spring when not held open by the thermostat. An object of the present invention is to provide improvements on and modifications of the constructions described in said patent and said copending application.

Not only is it desirable to keep the shutters open in hot weather, and in cold weather to close the shutters as soon as the motor stops running, but there is an intermediate condition, as in spring and autumn, when it is desirable to maintain control of the shutters by the thermostat without intervention of motor control. It is therefore an object of my invention to provide means by which the motor control of the connection between the thermostat and the shutters may be rendered inoperative whenever so desired.

Another object of the invention is to provide an automatic regulator which may be conveniently located on the instrument board of a motor vehicle and by which the driver, without leaving his seat, may set the shutter control mechanism for hot, cold or moderate weather conditions.

Other objects and advantages of my invention will appear in the following description of several embodiments thereof and thereafter the novelty and scope of the invention will be pointed out in the claims.

In the accompanying drawings:

Figure 1 is a view in front elevation of a portion of an automobile partly broken away to disclose my improved shutter control mechanism installed therein;

Fig. 2 is a view in section of a dash-board regulator for the shutter control mechanism, the section being taken on the line 2—2 of Fig. 1;

Fig. 3 is a fragmental view in section taken substantially on the line 3—3 of Fig. 1, with a cylinder and certain other parts shown in full and representing the position of the parts as set for cold weather conditions when the radiator is hot, but the shutters are closed because the motor has stopped running;

Fig. 4 is a view in section of said cylinder and associated parts, the thermostat being omitted, and the section being taken on the line 4—4 of Fig. 6;

Fig. 5 is a similar view, but only partly in section, illustrating the position of the parts when the radiator is hot, but the shutters are open because the motor is running;

Fig. 6 is a front elevation of the apparatus with certain parts broken away and others in section illustrating the relative position of the parts when the apparatus is set for summer or hot weather conditions;

Fig. 7 is a fragmental side view partly in section taken on the line 7—7 of Fig. 6;

Fig. 8 is a fragmental view in section taken on the line 8—8 of Fig. 6;

Fig. 9 is a side view of the apparatus looking in the direction of the arrows 9—9 of Fig. 6 with certain parts broken away and other parts in section;

Fig. 10 is a plan view of a modified form of the invention showing means for connecting the thermostat and shutters without intervening motor control and showing how the parts may be set to hold the shutters open, regardless of the condition of the thermostat;

Fig. 11 is a front elevation of the same with certain parts broken away;

Fig. 12 is a plan view of another modified form of the invention which includes clutch means controlled by the motor for connection between the shutters and the thermostat;

Fig. 13 is a view in section taken substantially on the line 13—13 of Fig. 12;

Fig. 14 is a fragmental view in section taken on the line 14—14 of Fig. 12;

Fig. 15 is a sectional plan view of still another modification of motor controlled clutch connection between the thermostat and shutters;

Fig. 16 is a view in section taken on the line 16—16 of Fig. 15; and

Fig. 17 is a view in section taken on the line 17—17 of Fig. 15.

In Figure 1 the upper portion of an automobile radiator 20 is shown with the usual shutter shell 22 fitted over the radiator and carrying shutters 23 mounted to turn on vertical axes. A spring 23a tends to close the shutters. In the upper portion of the radiator there is an opening fitted with a flange ring 24 which serves to support a thermostat that projects into the radiator.

As best shown in Fig. 3, the thermostat is of the bellows type and comprises a main casing 25 of cup-shape which has an outwardly turned rim 26. Between this rim and the flange ring 24 is fitted a gasket 27 and bearing against the outer face of the rim is a plate 28 which is clamped in place by a locking ring 29 screwed into the flange ring 24. The bellows 30 of the thermostat is secured at its outer end to a flange 31 carried by the casing 25 and at its opposite end to a plate 32 which is provided with a central stem 33. The thermostat contains a volatile fluid between casing 25 and bellows 30 so that when the thermostat is heated it will force the stem 33 outward and when cooled will draw the stem 33 inward.

A cup shaped support 34 is attached to the thermostat by a bolt 35 screwed into the stem 33. The cup 34 is cut away at opposite sides leaving a pair of outwardly extending arms 36. These arms are connected at their outer ends by means of a strap plate 37. A cylinder 38 is fitted to slide in the cup 34 and is provided on opposite sides thereof with studs 39. The cup is formed with recesses 40 through which the studs project. Brackets 42 secured to the plate 28 are also formed with recesses alined with the recesses 40 to provide clearance for the studs 39. A pair of bell cranks 44 are fulcrumed to the brackets 42. One arm of each bell crank is slotted to receive one of the studs 39 while the other arms 46 of the bell cranks have pivotal connection with a yoke 47. The yoke 47 is connected to the shutters 23, whereby movement of the cylinder 38 with respect to the brackets 42 will cause opening or closing of the shutters.

Mounted to operate within the cylinder 38 (Figs. 4 and 5) is a plunger comprising a plunger head 50 fitted with a cup leather 51, which bears against the walls of the cylinder. The cup leather is flared outwardly or toward the outer end of the cylinder so that it will provide a tight seal against suction in the cylinder, but will yield to pressure in the cylinder.

A clutch is provided for fixing the cylinder 38 to the cup 34. This clutch is engaged by relative movement of the cylinder 38 and plunger 50 to a predetermined locking position and is disengaged by relative movement to a predetermined unlocking position, but at intermediate positions the clutch is not affected. The plunger is provided with a stem 52 which at its outer end is formed with a head 53. Mounted to slide on the stem 52 is a sleeve 54. This sleeve has an enlarged bore to clear the head 53 of the stem but at its inner end the bore is reduced to fit closely on the stem. A screw plug 55 limits the play of the head 53 in the enlarged bore of the sleeve 54. The sleeve 54 is adapted to slide in a tubular bearing member 56 formed on the strap plate 37. The outer end of the cylinder 38 is closed by a plate 60 in which a central bushing 61 is fixed. In this bushing the tubular bearing member 56 is adapted to slide. The member 56 is provided with holes 62 near its free end to receive a number of balls 63 which are of larger diameter than the wall thickness of the member 56 and the bore of the bushing 61 at its inner end is enlarged to form a cup 64 which the balls may enter to clear the end of the sleeve 54 when the parts are in position shown in Fig. 5. A compression spring 66 is fitted between the strap plate 37 and the cylinder plate 60 which tends to move the parts to the declutched position shown in Fig. 4. A compression spring 67 within the cylinder bears against the plunger head 50 tending to force the plunger outward with respect to the cylinder. At one side of the cylinder there is a duct 68 which opens into the cylinder at the inner end of the latter. The opposite end of the duct communicates with a pipe 69 leading to the intake manifold of the motor or to any other part in which suction is induced by the running of the motor.

The operation of the mechanism so far described is as follows: When the motor is operated suction results in the pipe 69 and hence in the cylinder 38, which causes relative movement of the cylinder 38 and plunger 50. Under normal conditions the cylinder 38 occupies a fixed position when declutched from the thermostat (namely, the position shown in Fig. 4) because it is connected through bell cranks 44, yoke 47, and other means (presently to be described) to the shutters 23 which are normally held closed by spring 23a. However, the position of the plunger 50 varies with the temperature of the thermostat because the spring 67 presses it outwardly (downwardly, as viewed in Fig. 4) with the stem-head 53 bearing against plate 37 of cup 34 and said cup in turn has a fixed connection to the movable element 32 of the thermostat. When the thermostat is hot the plate 37 is moved outwardly to the position shown in Fig. 4 and the plunger 50 is widely spaced from the head of cylinder 38. Now, when the motor is started the resultant suction within the cylinder 38 will first draw the plunger inwardly (upwardly, as shown in Fig. 4) to take up the play of head 53 in sleeve 54 and then the plunger will be checked by the balls 63 which overlie the end of sleeve 54. Thereafter the cylinder 38 must move outwardly, causing the shutters 23 to open. When the cylinder 38 has moved far enough for the cup 64 to come into alinement with the balls 63, said balls will be forced out into the cup 64 by sleeve 54 due to further inward movement of the plunger 50. The cylinder will then be clutched to the thermostat, as shown in Fig. 5, and the shutters 23 will then be under direct control of the thermostat.

If the thermostat is cold when the motor is started the plate 37 may be so far retracted as to bring the balls 63 into alinement with the cup 64. Then when suction is developed in the cylinder 38 there will be no outward movement of said cylinder but the plunger 50 will be drawn inwardly, forcing balls 63 into cup 64 and thereby clutching the cylinder 38 fast to the thermostat. In other words, the clutching takes place without opening of the shutters.

The clutch engagement continues as long as there is any suction in the cylinder 38 and is not varied by fluctuations of suction, for as the suction varies, the plunger 50 will play outward and inward, but it will not release the clutch until the stem head 53 has taken up the play in the sleeve 54 and has moved the sleeve 54 outward sufficiently for the balls to clear the end of said sleeve. Since such a condition takes place only when the suction is reduced to practically zero, the shutters will be controlled by the thermostat directly as long as the engine is running, regardless of variation of suction produced by the engine. When the engine stops, however, suction in the cylinder 38 will be reduced to zero and spring 67 will force the plunger 50 outward to the position shown in Fig. 4, thereby releasing the clutch and disconnecting the shutters from the thermostat. The shutters, it will be understood, are arranged to close under spring pressure in the usual manner, so that when disconnected from the thermostat they will immediately close and retain heat in the radiator, regardless of the condition of the thermostat at the time.

The operation of the shutters as so far described relates to winter or cold weather conditions. To take care of summer or hot weather conditions, means are provided for locking the shutters 23 open, and a lost motion is provided between the yoke 47 and the shutters so as to permit idle play of the parts in response to thermostatic action. Thus the thermostat is not strained when the shutters are locked open. To provide for said lost motion the yoke 47 has a tubular extension 72 through which passes a bar 73. The latter is formed with a head 74 which bears against the inner face of the yoke 47. A spring 75 about the bar 73 and within the extension 72 presses at one end against the outer face of the yoke and at the opposite end against a coupling 76 which connects the bar 73 to an operating rod 77. The rod 77 is screwed into the coupling 76 to provide for adjustment and a nut 78 locks the rod at the desired adjustment. The rod 77 is connected to the shutters in the usual manner, so that when the bell cranks 44 are in the position shown in Fig. 3, the shutter is closed and when in the position indicated by broken lines in Fig. 5, the shutters are opened. As shown particularly in Figs. 3 and 6, the head 74 is formed with a pair of arms 80 extending inward toward the clutch mechanism. Between these arms 80 is a latch 81 pivoted on a pin 82 and provided near its free end with a transverse arcuate slot 83 which is engaged by a pin 84 fixed to the arms 80. This slot limits the extent of oscillation of the latch 81. A spring 85 secured to the head 74 bears against the latch and holds it normally in the position shown in Fig. 3. A bracket 86 is secured to the plate 28 and provides a threaded bearing 87 for a bolt 88. The bolt 88 is fitted with a spring pressed plunger having a head 89. By turning the bolt 88 the head 89 may be extended into the path of the latch 81, so that when the shutters are opened either manually or by the next thermostatic actuation, the latch 81 will snap by the bolt head 89 and will lock the shutters in open position. The spring pressed plunger will yield if the bolt happens to be fed outward when the latch lies in the path of the plunger and the latter will then spring outward as soon as the latch 81 is moved clear.

To provide for moderate weather conditions when it is advisable to maintain connection between the shutters and the thermostat whether the motor is running or not, means are provided for holding the plunger 50 so that it cannot disengage the clutch. To this end an arm 90 is fixed to a shaft 91 journaled in the strap plate 37. This arm projects through a slot 92 in the cylinder plate 60 and normally occupies the position shown by broken lines in Fig. 7. When, however, the arm 90 is swung to the position shown by full lines, it bears against an annular flange 50a of the plunger head preventing the plunger 50 from moving sufficiently to release the clutch connecting the cup 34 and the cylinder 38. Consequently, once the clutch has been engaged it cannot be automatically released when the suction in the cylinder falls to zero.

To move the arm to operative position the following mechanism is provided: Fixed to the shaft 91 is a crank 94 (see also Fig. 8) which at its outer end has a screw 95 engaging a slot 96 in a link 97. This link is arranged to slide along the face of the bracket 86 and to guide it in such sliding movement it is formed with a slot 98 which is engaged by a screw 99 carried by the bracket 86. An angular extension 100 of the link 97 is mounted to slide on the tubular exterior of the bearing 87. On this bearing and fitted between the angular extension 100 and a shoulder 87a near the inner end on the bearing 87 is a spring 101. A more powerful spring 102 bears against the opposite side of the extension 100 and is engaged at its opposite end by a flange collar 103 fixed upon the bolt 88. The bolt 88 is fixed to a flexible shaft 104 which extends to a regulating mechanism mounted on the dashboard of the automobile.

The regulating mechanism is shown clearly in Fig. 2. It comprises a dial casing 105 fitted with a dial 106 and a needle 107. The needle 107 is provided with a gear 108 which meshes with a pinion 109 carried by an operating shaft 110. The latter projects through the outer face of the casing and is fitted with a thumb piece 112. The flexible shaft 104 is connected to the shaft 110 by a coupling 113. The gearing between shaft 110 and the pointer or needle 107 is such that a number of turns of the shaft 110 will have to be made to swing the needle 107 through an angle of 180 degrees. On the face of the dial 106 are the markings. "Winter", "Spring and Autumn" and "Summer". When the parts are in the position shown in Fig. 1, the needle 107 points to "Winter". If it be desired to couple the thermostat to the shutters so as to operate them directly regardless of whether the engine is running or not the thumb piece 112 is turned until the pointer moves to "Spring and Autumn". On turning the shaft 110 and the flexible shaft 104 connected thereto, the bolt 88 is moved outwardly toward latch 81 and since the spring 102 is stronger than the spring 101 the link 97 will be moved in the same direction sufficiently to swing the arm 90 to the operative position where it will prevent release of the clutch. The bolt head 89, however, will not have been advanced sufficiently to engage the latch 81. If the needle 107 is turned to spring and autumn position while the clutch is disengaged and the parts occupy the position shown in Fig. 3, the arm 90 cannot swing to clutch locking position. The spring 102 will then yield until the motor is next started and the clutch is engaged, when the arm 90 will be swung under impulse of the spring 102 to the clutch-locking position shown in Fig. 7.

If it be desired to lock the shutters open so that they cannot be operated by the thermostat, the thumb piece 112 is turned further until the needle 107 points to "Summer". This will cause the bolt 88 to move out until its head 89 lies in the path of the latch 81. Thereupon if the radiator is not already hot, the shutters will open as soon as the radiator does become heated and the latch 81 will then engage the bolt head 89, holding the shutters open. Owing to the spring connection 75 between the bar 73 and the yoke 47 the thermostat and associated mechanism can operate freely without strain although the shutters are held open.

In Figs. 10 and 11, I show another form of my invention adapted for use in systems which do not employ means controlled by the running of the motor to effect connection between the thermostat and the shutters. In this modification, means are provided for holding the shutters open under hot weather conditions regardless of the operation of the thermostat. In Fig. 10, a portion of an automobile radiator is shown at 120 which is provided with the usual opening to receive a thermostat. This opening is closed by a plate 121. Said plate 121 carries a housing 122 into which projects a rod 123 which at its inner end is connected to the thermostat (not shown). The outer end of the rod 123 is pivotally connected to a crank 124 fixed upon a shaft 125 journaled in the housing 122. This shaft projects from one side of the housing 122 and carries near its outer end a crank arm 126. The arm 126 is fixed upon the squared portion of the shaft 125, so as to turn with said shaft and is secured upon the shaft by a nut 127 screwed upon the threaded end of the shaft. Journaled upon the body of the nut 127 is a lever 128 which at one end is formed with a flange 129 bearing a set screw 130. This set screw is threaded through the flange 129 and may be secured at any desired adjustment by a lock nut 131. Adjacent the flange 129 is a pin 132 riveted or otherwise secured to the lever 128 and projecting across the path of the crank 126. The crank 126 is preferably formed with a notch 133 to receive the pin 132. The outward end of the lever 128 is bifurcated to provide trunnion bearings for a block 134. The operating rod 135 which is connected to the shutters, passes through the block 134 and may be secured at desired adjustment with respect to said block by means of lock nuts 136 threaded on the rod and bearing against opposite ends of the block 34. It will be observed that while rod 77 in the structure shown in Fig. 1 is pulled by the thermostat to open the shutters, the rod 135 of Fig. 10 is pushed by the thermostat in the direction of the arrow to open the shutters.

Under normal conditions, when it is desired to have the thermostat actuate the shutters, the adjusting screw 130 is unscrewed so as to provide sufficient clearance between the end of said screw and the plate 121 for the shutters to close. Then as the thermostat heats up the crank arm 126, by engaging the pin 132, will cause the lever 128 to oscillate and force the rod 135 in the direction of the arrow in Fig. 10, opening the shutters. When the thermostat contracts and the arm 126 is withdrawn from the pin 132 the lever 128 will follow the movement of the arm 126, owing to the spring pressure normally provided on the shutters and tending to return them to closed position. When it is desired to prevent operation of the shutters by the thermostat and to hold them open regardless of the operation of the thermostat, the set screw 130 is turned to engage the plate 121 and swing the lever 128 to position shown in Fig. 10. This causes the shutters to open and they will remain in such open position regardless of the thermostat which then merely operates the arm 126 idly.

In Figs. 12 to 14 inclusive, I show another form of my invention in which a clutch controlled by the running condition of the motor effects the connection between the thermostat and the shutters. In this modification, a portion of the automobile radiator is shown at 140 and is provided with an opening 141 in which the thermostat (not shown) is seated. The opening 141 is closed by a plate 142 provided at its center with a housing 143 into which projects a rod 144. This rod is connected at its inner end to the thermostat, while the end within the housing is pivotally connected to a crank 145 fixed upon a shaft 146. This shaft extends through one side of the housing and has fixed thereon a collar 147 provided with a curved offset arm 148. Rising from the plate 142 are posts 150 which support a cylindrical bracket 151. Slidable in this bracket is a cylinder 152 which normally bears against the cam arm 148. If desired, the cam arm may be slotted as shown at 153 to clear the head of a bolt 154 projecting from the inner end wall 155 of the cylinder 152. This merely serves as a guide and is not essential to the operation of the mechanism.

Fitted within the cylinder 152 is a plunger 156 which is provided with an eccentric stem 157. A pin 158 also projecting from the plunger is adapted to slide in a bearing 159 carried by the end wall 155 and serves to guide the plunger so as to prevent cramping thereof due to the eccentric location of the stem 157. A clutch is provided for connecting the cylinder to a shutter operating arm 167, and this clutch is controlled by the stem 157 of the plunger in a manner similar to that described in connection with the construction shown in Figs. 1 to 9 inclusive. The stem 157 carries a sleeve head 160 which has limited axial play on the stem 157 like the member 54 on stem 52. The sleeve-head 160 slides in a sleeve 161 and the latter in turn slides in a bushing 162 fixed to the end wall 155. The sleeve 161 is secured to a disk 164 by a screw 165 which is threaded into the bore of the sleeve. The disk 164 is provided with trunnions 166 journaled in the arm 167, which is U-shaped, as clearly shown in Fig. 14. The arm 167 is mounted to turn freely on the body of a nut 168 screwed on the end of the shaft 146. The sleeve-head 160 on the stem 157 is formed with a reduced portion 169. At the inner end of the sleeve 161 are holes to receive balls 170 of larger diameter than the sleeve wall. When the clutch is disengaged the balls 170 overlap the inner end of the reduced portion 169 of the sleeve-head. The inner end of the bushing 162 is provided with an enlarged bore forming a cup 171. A compression spring 172 is fitted between the wall 155 and the disk 164. A compression spring 173 is fitted between the outer end wall or head 174 of the cylinder and the plunger 156. The cylinder head 174 is formed with a hollow extension or boss 175 which is at all times in open communication with the interior of the cylinder and communicating with the interior of this extension is a pipe 176 which leads to the intake manifold of the motor.

The operation of the mechanism as so far described is as follows: When the parts are in position shown in the drawings the rod 144 will move inward or outward under control of the thermostat and in so doing will cause the cam arm 148 to oscillate, moving the cylinder 152 correspondingly. When the motor is running, suction is produced in the cylinder 152 causing relative movement between the plunger 156 and the cylinder head 174 against the pressure of the spring 173. Owing to this relative movement, the sleeve-head 160 of the plunger stem 157 engaging the balls 170, will draw the sleeve 161 into the bushing 162, and after the parts are moved sufficiently to bring the balls 170 into register with the cup 171, the balls will be forced outward into the cup 171 by the reduced portion 169 of the stem head. When this happens, the sleeve 161 will be locked fast to the cylinder 152 so that the disk 164 and the U-shaped arm 167 in which it is journaled will be clutched to the cylinder. It will be observed that in this case the clutch operation while similar to that shown in Figs. 4 and 5 differs therefrom in the fact that the position of the cylinder 152 when declutched is limited by the thermostat, and the plunger 156, except for the lost motion in the sleeve-head, is controlled by the shutters. The cylinder 152 is forced toward the left, as shown in Fig. 13, by the arm 148 which is controlled by the thermostat, while the plunger 156 is limited in its outward movement (toward the right, as shown in Fig. 13) by the screw 165 which secures the sleeve 161 to the disk 164 carried by the U-shaped arm 167. Normally, the arm 167 is held in the position shown in Fig. 12 by means described hereinafter which operatively connect said arm 167 with the shutters, the latter being normally closed. When suction is developed in the cylinder 152, it can not be drawn toward the right if the thermostat is hot because it is checked by the arm 148. Hence the plunger 156 must be drawn inwardly (to the left as shown in Fig. 13) until the balls 170 are forced out into the cup 171. In this movement of the plunger, however, the arm 167 is swung on its pivot and causes the shutters to open. If the thermostat were cold, however, the suction would cause the cylinder 152 to move toward the right, as shown in Fig. 13, until it contacted with the arm 148. In any case, the cylinder 152 would be clutched to the arm 167 by relative movement of the plunger 156 and cylinder 152 and thereafter any movement of the thermostat would be communicated to the shutters.

Journaled on the body of the nut 168 adjacent the arm 167 is a lever 178 which carries a pin 179 projecting into the path of said arm. The opposite end of the lever 178 is bifurcated to provide bearings for a block 180, and through this block passes a rod 181 which is connected to the shutters. Like rod 135, the rod 181 must be pushed by the thermostat (to the right, as shown in Fig. 12) to open the shutters. The rod 181 is threaded to receive lock nuts 182 bearing respectively against opposite sides of the block 180 and providing for adjustment of the rod 181 with respect to the lever 178. The usual spring pressure on the shutters tending to hold them shut urges the rod 181 in the direction of the arrow "x", Fig. 12, and holds the pin 179 normally in engagement with the U-shaped lever 167. When the thermostat expands and the lever 167 is clutched to the cylinder 152 so that it moves in response to the thermostat, it will cause opening of the shutters owing to engagement of the pin 179 with the U-shaped lever 167. This condition prevails however only while the motor is running because it is only at such times that the clutch is engaged. Once the clutch has been engaged variations of suction produced by the engine will not release the clutch until the suction is reduced to practically zero because it will be obvious that the stem 157 can move considerably before the portion 169 of the sleeve-head 160 will clear the balls 170. The extent of this movement depends upon the length of the reduced portion 169 and also upon the free play of the sleeve head 160 on the stem 157 and between the sleeve-head 160 and the screw 165. When the suction is reduced to zero the spring 173 causes the plunger to move to the right as viewed in Fig. 13, until the portion 169 of the sleeve-head clears the balls and permits them to move inward upon the stem 157, clearing the cup 171, thereupon the spring 172 will return the parts to the position shown in Fig. 13.

In order to lock the shutters open in hot weather the following mechanism is provided: Swiveled upon one end of the lever 178 adjacent pin 179 is a block 185 through which a rod 186 is threaded. This rod is connected to a shaft 187 by a pin-and-slot coupling 188 providing considerable lost motion. The shaft 187 is connected at its opposite end to a flexible shaft 189 which like the shaft 104 above described runs to a regulator of the type shown in Fig. 2. By turning the shaft 189, the rod 186 will be fed forward with respect to block 185 and with the free end of the rod abutting against the plate 142 will force the arm 178 rearward, thereby opening the shutters. While the shutters are thus positively held open, there will be no strain whatsoever on the thermostat which may continue to function in the usual manner without affecting the shutters, because the U-shaped lever 167 may oscillate without doing any work since pin 179 on lever 178 is held clear of the lever 167.

When the regulator is turned to moderate weather position the rod 186 is not fed forward sufficiently to open the shutters, but other means come into play which prevent release of the clutch connecting the cylinder and the arm 167. Said means will now be described. As shown in Fig. 13, the shaft 187 is formed with an enlarged portion 190 which fits into an internally threaded sleeve 191. The rear part of the portion 190 is formed with an upset thread to mesh with the thread in said sleeve. The latter has a lateral tubular projection 192 which is threaded upon a nipple 193, the nipple being screwed into an opening in the hollow boss 175. Mounted to slide in the tubular extension are two alined pins 195 and 195a which are connected by a spring 196. Another spring 197 weaker than the spring 196 urges the pin upward or toward the shaft 187. When the parts are set for cold weather condition, the shaft 187 is withdrawn so that the enlargement 190 will clear the upper end of the pin 195 and pin 195 will be urged by the spring 197 acting on pin 195a and spring 196 into the sleeve 191. When, however, the shaft 187 is fed forward the enlarged portion 190 thereof will depress the pin 195 causing the lower end of pin 195a to enter the hollow boss 175, as shown in Fig. 13. When in this position the pin 195a serves as a latch to hold the plunger 156 in its inner position and thereby keeping the clutch engaged. To this end, the plunger 156 is provided with a stem 200 which extends toward the hollow boss 175. The outer end of the stem 200 is headed to retain a tubular member 202 slidable thereon. A spring 203 normally presses the member 202 outward. The member 202 is formed with a head 204 which is beveled outwardly but terminates on the inward side in an abrupt shoulder 205 adapted to engage the latch pin 195.

Assuming that the regulator is set for moderate weather conditions with the portion 190 depressing the latch pin 195 so that it projects into the tubular boss, when sufficient suction is produced in the cylinder to retract the plunger and engage the clutch, the shouldered head 204 will snap past the latch pin 195a and will lock the plunger in its retracted position. The spring 196 permits the pin 195a to move axially as the head 204 moves into latched position. As long as the plunger 156 is thus locked, it will be impossible to release the clutch and the shutters will have to obey the movement of the thermostat whether the motor is running or not. When the shaft 187 is moved back toward winter position and the portion 190 is moved clear of pin 195, the spring 197 will withdraw the latch pin 195a from the shoulder 205 releasing the plunger so that when the motor stops the clutch will be disengaged.

The position of the parts in Fig. 13 is that which they will occupy when the regulator is turned to summer position while the motor is not running but while the radiator is still hot. It will be observed that the rod 186 is holding the arm 178 in retracted position thereby holding the shutters open. The clutch is disengaged because the motor is not running. The thermostat is partially heated as indicated by the position of the cam arm 148 which is holding the cylinder approximately midway of its stroke. The plunger 156 is in idle position and although the latch pin 195 is projecting into the hollow boss 175 the plunger is not latched. As soon, however, as the motor is started and the clutch engaged the plunger will be latched in the manner described above.

In the construction shown in Figs. 15 to 17 inclusive the connection between the thermostat and the shutters is rendered operative or inoperative depending upon whether a backing provided for the thermostats is fixed or not. The thermostats are movable bodily from operative to inoperative position, and for winter running conditions I provide means for moving the thermostats into operative position only when the motor is running. The apparatus is also capable of maintaining a fixed operative relation between the thermostat and the shutters during moderate weather conditions and also of locking the shutters open during summer conditions.

In Fig. 15 a portion of a radiator is indicated at 220. Projecting through the radiator is a cylindrical chamber 221 closed by a front end wall 222. A cup-shaped bracket 223 is provided with a flange 224 which is secured to the rear end of the cylindrical chamber by bolts 224a. Within the chamber 221 is a thermostat 225 which may be of the same type as that shown in Fig. 3, or may consist of a number cells connected in series as shown in Fig. 15. However, the particular type of the thermostat used forms no part of the present invention and hereafter in using the term "thermostat" it will be understood that this may apply to a number of thermostats connected together or to a single thermostat.

The thermostat 225 is secured at its inner end to a rod 226 while at the opposite end it bears against a thrust block 227. The rod 226 is threaded into a rectangular frame 228 preferably formed of strap metal. This frame passes through slots 229 in the cup 223. The frame 228 is thus capable of limited movement with respect to the cup bracket 223. At the opposite end of the thermostat, the thrust block 227 is fixed to a pin 230 which slides in a tubular guide 231 secured to a rectangular frame 232. This frame is disposed at right angles to the frame 228 and is located partly within the chamber 221 and partly outside, with the legs of the strap passing through slots 233 in the flange 224. The tubular guide 231 is adapted to slide in a socket member 235 formed at the end of a rod 236 which in turn is adapted to slide in a bearing formed in the end wall 222. The rod 236 leads to the shutters, being so connected thereto that as it is forced outward from the chamber the shutters will be forced open against the usual spring means tending to close them. Between the frame 232 and the thrust block 227 a compression spring 237 is provided. As a result, when the thermostat 225 expands it will advance the guide 231 through the medium of the spring 237 until said guide bottoms in the socket 235 after which further movement will force the shutter rod 236 outward to open the shutters. In the drawings, Fig. 15, the thermostat is shown in retracted or idle position, which position it would normally occupy when the radiator is cool and the motor is not running.

Mounted in the cup 223 is a cylinder 238. The cylinder 238 is fixed to the cup by means of screws 239 which pass through slots 240, so as to provide for adjustment of the position of the cylinder 238 with respect to the cup and are threaded into the cylinder head 241 or inner end wall. An elbow fitting 242 passes through one of the slots 243 and is screwed into the cylinder head 241. This provides communication through a passage 243 to the interior of the cylinder and a tube 244 threaded into the elbow leads to the intake manifold of the motor. The outer end of the cylinder 238 is closed by an end plate 245 which carries a pair of posts 246 extending outwardly and passing through suitable openings in the strap frame 232. The posts are connected at their outer ends by a cross head 248.

Within the cylinder is fitted a plunger 249, and a spring 250 bearing between the plunger 249 and the cylinder head 241 normally presses the plunger 249 outward. The plunger 249 controls a clutch by which the frame 228 is connected to the cylinder 238 and is provided with a stem 251 which at its outer end has a stepped head. This head comprises an outer portion 252 of large diameter and an inner portion 253 of reduced diameter. The portion 252 has sliding engagement with a sleeve 254 fixed to the outer end of the strap frame 228. The sleeve 254 in turn slides in a bushing 255 fixed to the end plate 245 of the cylinder. This bushing at its inner end is formed with an enlarged bore to form a cup 256. The sleeve 254 is provided at its inner end with holes passing transversely therethrough to receive balls 257. These balls are of greater diameter than the wall of the sleeve so that they normally engage the stem 251 of the plunger when the parts are in the position shown in Fig. 15. A spring 259 is fitted between the end wall 245 of the cylinder and the outer end of the strap frame 228 so that under the normal conditions shown in the drawings, the strap frame 228 is held in retracted position and the thermostat 225 carried thereby is also in retracted position.

The operation of the parts so far described is as follows: When the motor is started, suction caused thereby will draw the plunger 249 into the cylinder 238 against the pressure of spring 250 and the portion 253 of the head of the plunger stem by pressing against the balls 255 will draw the sleeve 254 and hence the strap 228 inward, thereby moving the thermostat 225 to operative position. When this takes place the strap frame 232 will be advanced through the medium of the spring 237 so that the guide 231 will be moved into engagement with the bottom of the socket member 235. Then, as the thermostat expands and contracts the rod 236 will be moved outward and inward opening the shutters and letting them close in accordance with the temperature conditions prevailing in the radiator. When the sleeve 254 is thus moved forward the balls 257 will be pushed outward into the cup 256 by the portion 253 of the stem head and the strap frame 228 will then be locked in its advanced position. In the meantime, variations of suction, due to variations in the running condition of the motor, will have no effect upon the position of the strap frame 228 because the clutch which holds the strap frame in its advanced position will remain engaged. The plunger 249 may play inward and outward in the cylinder without unlocking the clutch due to the length of the reduced portion 253 which holds the balls 257 in the cup 256. Not until the reduced portion 253 has moved outward sufficiently to clear the balls 255 will the clutch release and this can take place only when the suction in the cylinder is reduced practically to zero.

In order to provide for moderate weather conditions in which it is desirable to maintain the connection between the thermostat and the shutters at all times, I provide means for preventing the clutch from disengaging even when the motor is not running. This is effected by preventing the plunger stem from moving outward sufficiently to unlock the clutch. Mounted to slide in the sleeve 254 is a locking sleeve 260 which is formed with a head at its inner end 261 adapted to co-act with a lip 262 formed at the outer end of the sleeve 254. Within the sleeve 260 is a guide pin 263 which at its outer end is connected to a threaded rod 264. This rod passes through and has threaded engagement with the cross-head 248. A flexible shaft 265 which runs to the dashboard control and which corresponds in general to the flexible shaft 104 in Fig. 2, is provided with a stem 266 which enters a bore 267 in the rod 264. The stem carries a key 268 which engages a slot 269 formed in the rod 264. Thus, as the shaft 265 is turned from the dash control, the rod 264 will be threaded through the cross head 248 advancing the pin 263. Fixed upon the stem 263 near its outer end is a collar 270 and similarly fixed to the outer end of the sleeve 260 is a collar 271. A spring 272 is fitted between these collars. Thus, as the pin 263 is advanced, the sleeve 260 will be forced forward by pressure of the spring 272, bearing resiliently against the head 252 of the plunger stem. When the shaft 265 is turned to the spring and autumn position, the plunger 249 is fed inward until the clutch is locked. However, as this requires considerable force the result normally will be that the spring 272 will be compressed, and as soon as the motor is started and the plunger 249 is drawn inward by suction, the spring will expand and thereafter will lock the clutch in engaging position. This will maintain the thermostat in its advanced operative position, regardless of variation in running condition of the motor and regardless of whether the motor stops, so that the thermostat and shutters will be operatively connected at all times.

There remains, however, the condition under which it is desirable to maintain the shutters open at all times. As shown in Fig. 15, the strap frame 232 is provided with an outer extension 274 which is formed with an opening 275 through which the pin 263 and the spring 272 may play freely. When the shaft 265 has been turned to the Summer position, the collar 270 will have been advanced sufficiently to bear against the extension 274, pressing the strap frame 232 forward and forcing the rod 236 outward, thereby holding the shutters open. When this takes place, the thermostat 225 may expand or contract at will without in the least affecting the shutters which are maintained in open position. Since the thermostat is thus left free to expand and contract there will be no strain thereon due to the fact that the shutters are held open.

When the motor is overheated the thermostat 225 will be over expanded. In thermostatic shutter controls as heretofore constructed there is no space allowed for over expansion of the thermostats in axial direction and under abnormal heat conditions the thermostats are not infrequently bulged to such an extent as to burst or spring a leak, rendering them valueless for further service. This difficulty I avoid by providing a yielding connection between the thermostats and the frame 232. Thus, the spring 237 while powerful enough to transmit an operating thrust to the shutters, will yield under excess pressure after the shutters have been opened.

While I have described several embodiments of my invention, it will be understood that these are to be taken as illustrative and not limitative of my invention and that I reserve the right to make such changes in form, construction and arrangements of parts as fall within the spirit and scope of the following claims.

I claim:

1. In combination with an engine radiator, a shutter for the radiator, a thermostat, means for operatively connecting the thermostat and the shutter, a latch carried by the connecting means, a bolt movable into the path of the latch to lock the connecting means at a predetermined position, and means for resiliently moving the bolt into such locking position.

2. In combination with an engine including a radiator, a shutter for the radiator, a thermostat, a device connected at one end to the shutter, a member having lost motion on the other end of the connecting device, a spring for taking up such lost motion, means connecting the thermostat to said member, a spring latch carried by the connecting device, a bolt movable across the path of the latch and cooperating therewith to arrest motion of the connecting device in a predetermined position, and manually controlled yielding means for moving the bolt yieldably to latch engaging position.

3. In combination with an internal combustion engine and its cooling system including a radiator, means for controlling the cooling capacity of the radiator, means normally disconnected from said control means for operating the same, means responsive to the running condition of the engine for connecting the controlling means to the operating means, and manually operable means for preventing disconnection of the connecting means.

4. In combination with an internal combustion engine and its cooling system including a radiator, means for controlling the cooling capacity of said radiator, a thermostat for operating the controlling means but normally disconnected therefrom, means responsive to suction in the engine for connecting the thermostat and controlling means, and manually operable means for preventing disconnection of said connecting means.

5. In combination with an internal combustion engine and its cooling system including a radiator, means for controlling the cooling capacity of said radiator, a thermostat normally disconnected from the controlling means, means responsive to suction in the engine for establishing an operative relation between the thermostat and the controlling means, and manually operable means for preventing dis-establishment of such operative relation when the engine stops running.

6. In combination with an internal combustion engine and its cooling system including a radiator, means for controlling the cooling capacity of said radiator, a thermostat normally disconnected from said controlling means, means responsive to suction in the engine for establishing an operative connection between the thermostat and the controlling means, normally inactive retaining means for preventing disestablishment of said connection, means operable at will for setting said retaining means whereby the latter will become effective after said fixed connection has been established.

7. In a temperature control device, a shutter, an actuating means therefor, suction means for establishing an operative connection between the shutter and the actuating means, means for maintaining the operative connection unvaried by subsequent fluctuations of suction, and manually operable means for maintaining said operative connection unvaried after suction ceases.

8. In combination with an engine and a shutter therefor, a shutter actuating device, a normally inactive connection between the shutter and the actuating device and comprising a pair of relatively movable members, means operated by power of the engine for latching said members against relative movement and for unlatching said members when the engine stops running, and manually controlled means operable at will to prevent unlatching of said members.

9. In combination with an engine and a shutter therefor, a thermostat for operating the shutter, a clutch for making and breaking operative connection between the shutter and the thermostat, lost motion means for operating the clutch, said lost motion means including a cylinder and a plunger and means for connecting the cylinder to a source of variable fluid pressure developed by the running condition of the engine whereby the plunger will move in and out of the cylinder in response to variations of said pressure, means operated by the plunger when in one position for connecting the clutch and when in another position for disconnecting the same, and a stop manually operable to prevent the plunger from reaching the clutch disconnecting position.

10. In combination with an engine and a shutter therefor, a thermostat for operating the shutter, a clutch for making and breaking operative connection between the shutter and the thermostat, lost motion means for operating the clutch, said means including a cylinder and a plunger and means for connecting the cylinder to a source of variable fluid pressure developed by the running condition of the engine whereby the plunger will move in and out of the cylinder in response to variations of said pressure, means operated by the plunger when in one position for connecting the clutch and when in another position for disconnecting the same, a normally inactive arresting means, manually controlled means for moving the arresting means to a position to prevent the plunger from reaching the clutch disconnecting position, and a yielding connection between the manually controlled means and the arresting means.

11. In combination with an engine and a radiator therefor, a shutter for the radiator, a thermostat adapted to operate the shutter but normally disconnected therefrom, a clutch operable by suction of the engine for connecting the thermostat and the shutter whereby the shutter will open and close under control of the thermostat, means for locking the shutter open, detaining means for preventing disconnection of the clutch when suction ceases and manually operable means for operating the detaining means.

12. In combination with an engine and a shutter therefor, a thermostat for operating the shutter but normally disconnected therefrom, a clutch operable by suction of the engine for connecting the thermostat and the shutter whereby the shutter will be opened when the thermostat expands, a spring for closing the shutter when the thermostat contracts, means for locking the shutter open, detaining means for preventing disconnection of the clutch when suction ceases, and a manual control for operating the detaining means and the locking means successively.

13. In combination with an engine and a shutter therefor, a thermostat for operating the shutter but normally disconnected therefrom, a clutch operable by suction of the engine for connecting the thermostat and the shutter whereby the shutter will be opened when the thermostat expands, a spring for closing the shutter, means for locking the shutter open, detaining means for preventing disconnection of the clutch when suction ceases, a manual control for operating the detaining means and the locking means successively, and an indicator for indicating the position of the last two means.

14. In combination with an engine and a shutter therefor, a thermostat for operating the shutter, a connecting device connected at one end to the shutter, a member having lost motion on the other end of the connecting device, a spring for taking up said lost motion, a clutch, one element of the clutch being connected to the thermostat and the other element to said member, a cylinder connected to a source of variable fluid pressure developed by the engine, a plunger movable in the cylinder by such pressure variations, means operated by the plunger when in one position to connect and when in another to disconnect said clutch elements, normally inactive arresting means for preventing the plunger from moving to disconnecting position, normally inactive latch means for engaging the connecting device to hold the shutter open, and manually operable means movable to one position to render the arresting means active and to another position to render the latching means active.

15. In combination with an engine and a shutter therefor, a thermostat for operating the shutter, a connecting device connected at one end to the shutter, a member having lost motion on the other end of the connecting device, a spring for taking up said lost motion, a clutch, one element of the clutch being connected to the thermostat and the other element to said member, a cylinder connected to a source of variable fluid pressure developed by the engine, a plunger movable in the cylinder by such pressure variations, means operated by the plunger when in one position to connect and when in another to disconnect said clutch elements, normally inactive arresting means for preventing the plunger from moving to disconnecting position, normally inactive latch means for engaging the connecting device to hold the shutter open, and manually operable means movable from normal to one position to render the arresting means active and to a further position to render the latching means active.

16. In combination with an engine and a shutter therefor, a thermostat for operating the shutter, a connecting device connected at one end to the shutter, a member having lost motion on the other end of the connecting device, a spring for taking up said lost motion, a clutch, one element of the clutch being connected to the thermostat and the other element to said member, a cylinder connected to a source of variable fluid pressure developed by the engine, a plunger movable in the cylinder by such pressure variations, means operated by the plunger when in one position to connect and when in another to disconnect said clutch elements, normally inactive arresting means for preventing the plunger from moving to disconnecting position, a spring latch on the connecting device, a bolt yieldably movable across the path of the latch to engage the same and hold the shutter open, and manually operable means adapted upon movement from normal to one position to actuate the arresting means and upon further movement to another position to project the bolt into the path of the latch.

17. In combination, a shutter for an automobile radiator, means for regulating the shutter, said means including a suction operated device and a clutch placed in locking position when the device is fully contracted, automatic means for releasing the clutch when the suction ceases, and means for locking said device against operation.

LOUIS G. HARTDORN.